United States Patent
Lehmus et al.

(10) Patent No.: US 7,157,534 B2
(45) Date of Patent: Jan. 2, 2007

(54) POLYMERIZATION PROCESS FOR PRODUCING COPOLYMERS

(75) Inventors: Petri Lehmus, Porvoo (FI); Kimmo Hakala, Porvoo (FI); Päivi Pitkänen, Porvoo (FI); Manfred Arnold, Porvoo (FI); Andreas Meinecke, Porvoo (FI); Udo Manfred Stehling, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/476,646

(22) PCT Filed: May 3, 2002

(86) PCT No.: PCT/GB02/02057

§ 371 (c)(1),
(2), (4) Date: Apr. 6, 2004

(87) PCT Pub. No.: WO02/090399

PCT Pub. Date: Nov. 14, 2002

(65) Prior Publication Data

US 2004/0158010 A1  Aug. 12, 2004

(30) Foreign Application Priority Data

May 4, 2001 (GB) .................................. 0111020.4

(51) Int. Cl.
*C08F 6/6292* (2006.01)
*C08F 6/44* (2006.01)
*C08F 210/06* (2006.01)

(52) U.S. Cl. ...................... 526/160; 526/165; 526/348; 526/348.2; 526/943

(58) Field of Classification Search ................ 526/160, 526/165, 348, 348.2, 943
See application file for complete search history.

(56) References Cited

U.S. PATENT DOCUMENTS

| 4,297,465 A | | 10/1981 | Smith |
| 5,599,885 A | * | 2/1997 | Kawasaki et al. ............. 526/68 |
| 5,629,254 A | * | 5/1997 | Fukuoka et al. ............. 502/117 |
| 5,677,408 A | * | 10/1997 | Ueda et al. ............... 526/348.6 |
| 6,084,041 A | | 7/2000 | Andtsjö et al. |
| 6,627,723 B1 | * | 9/2003 | Karandinos et al. ........ 526/348 |

FOREIGN PATENT DOCUMENTS

| DE | 41 30 299 | 3/1993 |
| WO | WO 98/58976 | 12/1988 |
| WO | WO 99/29742 | 6/1999 |

* cited by examiner

*Primary Examiner*—Caixia Lu
(74) *Attorney, Agent, or Firm*—Sughrue Mion, PLLC

(57) ABSTRACT

The invention provides a process for the preparation of a propylene polymer in which propylene and a comonomer copolymerizable therewith and of greater molecular weight than propylene are polymerized in a single site catalyst catalized polymerization reaction, characterised in that said polymerization reaction is effected at least in part at a temperature of at least 70° C.

11 Claims, 1 Drawing Sheet

POLYMERIZATION PROCESS FOR PRODUCING COPOLYMERS

Figure 1:
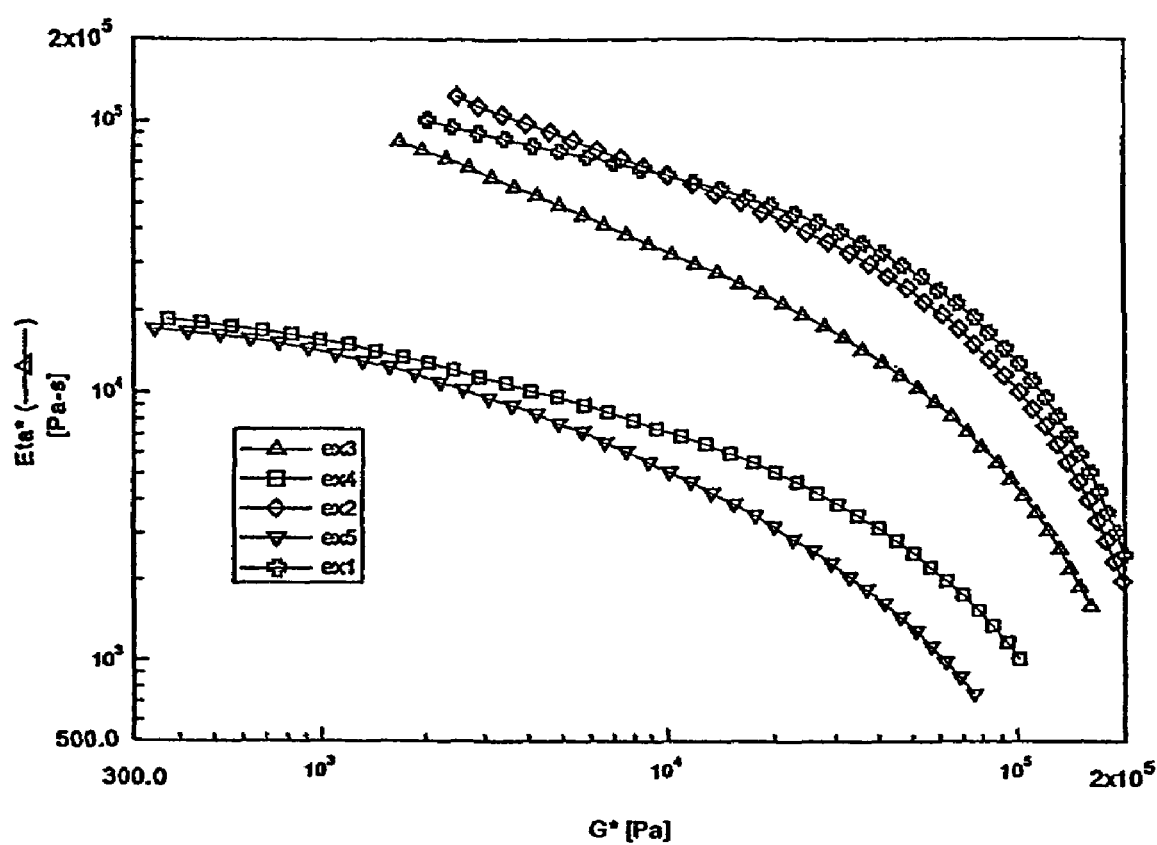

This application is a 371 of PCT/GB02/02057, filed May 3, 2002; the disclosure of which is incorporated herein by reference.

This invention relates to a process for the preparation of propylene polymers, in particular copolymers of propylene with higher molecular weight comonomers, and to the polymers thereby produced and their uses.

It is well known that polymerizing propylene with higher molecular weight comonomers, i.e. comonomers having more than three carbon atoms per molecule, for example $C_{4-30}$ α-olefins, can confer beneficial properties on the resulting copolymer as compared with propylene homopolymers, e.g. in terms of crystallization behaviour, melting temperature (Tm) and glass temperature (Tg). However the incorporation rate of the higher molecular weight comonomer is lower than that of propylene and this has limited their use as comonomers, as compared with ethylene, in the preparation of propylene copolymers. Two particular problems that arise from this low incorporation rate are that the polymer product may contain significant residual levels of unreacted comonomer which can result in problems of odour and taste, especially with diene and hexene comonomers, and that the polymerization process is inefficient in its usage of the generally more expensive comonomer since it must be present in the polymerization reactor in a higher-molar concentration relative to propylene than that would be the case if the incorporation rate was the same for both monomers.

Thus, for example, while the incorporation rate of higher molecular weight comonomers in propylene copolymers formed using single site catalysts is better than in copolymers formed using Ziegler-Natta catalysts, the comonomer incorporation rate is still considerably less than that of the propylene (see for example WO 01/48034, WO 95/32242 and Forlini et al., Macromol. Chem. Phys. 201: 401–408 (2000)).

Moreover polypropylenes produced using single site, eg metallocene, catalysts tend to have a narrower molecular weight distribution than those produced using Ziegler-Natta catalysts resulting in corresponding poor melt strengths. As melt strength is important for applications involving extrusion, blow molding, pipe, film or sheet formation, etc., this is a further disadvantage for single site catalyst based polypropylenes.

We have now surprisingly found that by carrying out the polymerization reaction at unusually high temperatures the comonomer incorporation rate can be increased to become comparable to or even greater than that of propylene, and that long chain branching (which increases melt strength) occurs, thus addressing the disadvantages discussed above.

Thus according to one aspect the invention provides a process for the preparation of a propylene polymer in which propylene and a comonomer copolymerizable therewith and of greater molecular weight than propylene are polymerized in a single site catalyst (typically an organotransition metal catalyst (eg a metallocene catalyst)) catalysed polymerization reaction, characterized in that said polymerization reaction is effected at least in part (e.g. for at least 5%, for example 10 to 100% of the polymerization time or of the average residence time in a continuous reactor) at a temperature of at least 70° C.

In the process of the invention, the polymerization reaction is preferably effected at from 75 to 200° C., more preferably 80 to 125° C., still more preferably 85 to 120° C.

The higher molecular weight comonomer used in the process of the present invention is preferably an alkene or diene, in particular a $C_{4-30}$ alkene or diene (e.g. a $C_{4-20}$ α-olefin or diene, such as 7-methyl-1,6-octadiene or 1,7-octadiene), still more preferably an α-olefin, e.g. a $C_{4-18}$ α-olefin, such as for example 1-butene, 1-pentene, 1-hexene, 1-heptene, 1-octene, 1-nonene, 1-decene, 1-undecene, 1-dodecene, 1-tetradecene, 1-hexadecene and 4-methyl-1-pentene. The comonomer is especially preferably a $C_{4-16}$ linear or singly, doubly or triply branched (more preferably linear or singly branched) 1-alkene or 1,x-alkanediene (where $x \geq 3$).

The amount of comonomer used in the process of the invention is preferably up to 50 mole %, eg at least 0.1 mole %, more preferably 0.2 to 40 mole %, especially 0.4 to 30 mole %, more especially 0.5 to 25 mole %, still more especially 0.6 to 10 mole %, of the monomer mixture used in the copolymerization stage. (The polymerization can of course be effected as a two or more stage process, e.g. to produce a block copolymer or bimodal polymer).

The organotransition metal catalyst system used in the process of the present invention may be any organotransition metal catalyst system capable of polymerizing propylene. Such catalyst systems are well known in the literature and consist of an organotransition metal compound and, optionally, one or more activator(s) and, optionally, one or more carrier(s).

The organotransition metal catalyst system typically comprises at least one type of organotransition metal compound, or one organotransition metal compound containing one or more transition metals.

According to a preferred embodiment, the organotransition metal compound can be a member of the group of compounds known as metallocenes. Metallocenes contain at least one organic ligand, generally 1, 2 or 3, e.g. 1 or 2, which is η-bonded to the metal, e.g. a $η^{2-6}$-ligand, such as a $η^5$-ligand. Preferably, a metallocene contains a group 3 to 6 transition metal or a lanthanide metal or an actinide metal, and particularly preferably is a titanocene, zirconocene or hafnocene, and contains at least one $η^5$-ligand, which is for example an optionally substituted cyclopentadienyl, an optionally substituted indenyl, an optionally substituted benzoindenyl, an optionally substituted azulenyl or an optionally substituted fluorenyl.

The metallocene compound may thus for example be of formula I:

$$(Cp)_m R_n MX_q \qquad (I)$$

wherein each Cp independently is an unsubstituted or substituted and/or fused homo- or heterocyclopentadienyl ligand (e.g. substituted or unsubstituted cyclopentadienyl, substituted or unsubstituted indenyl, substituted or unsubstituted benzoindenyl, substituted or unsubstituted azulenyl, substituted or unsubstituted fluorenyl ligand, substituted or unsubstituted indolyl, or substituted or unsubstituted 4-aza-indenyl, the optional one or more substituent(s) being selected preferably from halogen, hydrocarbyl (e.g. $C_{1-20}$-alkyl, $C_{2-20}$-alkenyl, $C_{2-20}$-alkynyl, $C_{3-12}$-cycloalkyl, $C_{6-20}$-aryl or $C_{7-20}$-arylalkyl), $C_{3-12}$-cycloalkyl which contains 1, 2, 3 or 4 heteroatom(s) in the ring moiety, $C_{6-20}$-heteroaryl, $C_{1-20}$-haloalkyl, —SiR"$_3$, —OSiR"$_3$, —SR", —PR"$_2$ or —NR"$_2$ (where each R" is independently hydrogen or a hydrocarbyl group (e.g. $C_{1-20}$-alkyl, $C_{2-20}$-alkenyl, $C_{2-20}$-alkynyl, $C_{3-12}$-cycloalkyl, $C_{6-20}$-aryl or $C_{7-10}$ arylalkyl), or, for example in the case of —NR"$_2$, two substituents R" can form a ring, e.g. a five- or six-membered ring, together with the nitrogen atom they are attached to);

R is a bridge of 1–7 atoms, e.g. a bridge of 1–4 C-atoms and 0–4 heteroatoms, wherein the heteroatom(s) can be e.g. Si, Ge, O, S, N, P and/or B atom(s), whereby each of the bridge atoms may independently bear substituents, such as $C_{1-20}$-alkyl, tri($C_{1-20}$-alkyl)silyl, tri($C_{1-20}$-alkyl) siloxy or $C_{6-20}$-aryl substituents), or a bridge of 1 to 3, e.g. 1 or 2, heteroatoms, such as silicon, germanium, oxygen, sulphur, nitrogen, phosphorus and/or boron atom(s), e.g. —$SiR^1{}_2$— (wherein each $R^1$ is independently a $C_{1-20}$-alkyl, $C_{6-20}$-aryl or tri($C_{1-20}$-alkyl)silyl-group, such as a trimethylsilyl-group);

M is a transition metal of group 3 to 6, a lanthanide or an actinide, preferably a group 4 metal, e.g. Ti, Zr or Hf;

each X is independently a sigma-ligand, such as H, halogen, $C_{1-20}$-alkyl, $C_{1-20}$-alkoxy, $C_{2-20}$-alkenyl, $C_{2-20}$-alkynyl, $C_{3-12}$-cycloalkyl, $C_{6-20}$-aryl, $C_{6-20}$-aryloxy, $C_{7-20}$-arylalkyl, $C_{7-20}$-arylalkenyl, —SR", —PR"$_3$, —SiR"$_3$, —OSiR"$_3$ or —NR"$_2$ (where R" is as defined hereinbefore);

n is 0, 1 or 2;
m is 1, 2 or 3, e.g. 1 or 2;
q is 1, 2 or 3, e.g. 2 or 3;
m+q is equal to the valency of M; and each of the above mentioned ring moieties alone or as a part of a moiety as the substituent for Cp, X, R" or $R^1$ can further be substituted e.g. with $C_{1-20}$-alkyl which optionally contains or is interrupted by Si and/or O atoms.

Said metallocenes and their preparation are well known in the art, e.g. from BP-A-576970, EP-A-485823, EP-A-485821, EP-A-702030, EP-A-530647 and WO00/34341.

Suitable metallocenes are disclosed for example in U.S. Pat. No. 5,770,753, U.S. Pat. No. 6,057,408, WO 95/12622, EP-B-700406, and the documents cited above all of which are incorporated herein by reference.

Particularly preferred metallocenes include:

rac-$(CH_3)_2Si(2$-$CH_3$-4-phenyl-indenyl$)_2ZrCl_2$
rac-$(CH_3)_2Si(2$-$CH_3$-4-phenyl-indenyl$)_2TiCl_2$
rac-$(CH_3)_2Si(2$-$CH_3$-4-phenyl-indenyl$)_2HfCl_2$
rac-$(CH_3)_3Si(CH_3)Si(2$-$CH_3$-4-phenyl-indenyl$)_2ZrCl_2$
rac-$(CH_3)_2Si(2$-$CH_3$-4-(1-napthyl)-indenyl$)_2ZrCl_2$
rac-$(CH_3)_2Si(2$-$CH_3$-4-(4-tertbutyl-phenyl)-indenyl$)_2ZrCl_2$
rac-$(CH_3)_2Si(2$-$CH_2CH_3$-4-phenyl-indenyl$)_2ZrCl_2$
rac-$(CH_3)_2Si(2$-$CH_2CH_3$-4-(4-tertbutyl-phenyl)-indenyl$)_2$ $ZrCl_2$
rac-$(CH_3)_2Si(2$-$CH(CH_3)_2$-4-phenyl-indenyl$)_2ZrCl_2$
rac-$(CH_3)_2Si(2$-$CH(CH_3)_2$-4-(1-napthyl)-indenyl$)_2ZrCl_2$
rac-$(CH_3)_2Si(2$-$CH(CH_3)_2$-4-(4-tertbutyl-phenyl)-indenyl$)_2$ $ZrCl_2$
rac-$(CH_3)_2Si(2$-$CH(CH_3)_2$-4-(2-$CH_3$-phenyl)-indenyl$)_2$ $ZrCl_2$
rac-$(CH_3)_2Si(2$-$CH(CH_3)_2$-4-(3,5-$(CH_3)_2$-phenyl)-indenyl$)_2$ $ZrCl_2$
rac-$(CH_3)_2Si(2$-$CH_3$-4-phenyl-indenyl$)_2ZrCl(CH_3)$
rac-$(CH_3)_2Si(2$-$CH_3$-4-phenyl-indenyl$)_2ZrCl(NMe_2)$
rac-$(CH_3)_2Si(2$-$CH_3$-4-phenyl-indenyl$)_2ZrCl(O$-phenyl$)$
rac-$(CH_3)_2Si(2$-$CH_3$-4-phenyl-indenyl$)_2ZrCl(NEt_2)$
rac-$(CH_3)_2Si(2$-$CH_3$-4-phenyl-indenyl$)_2ZrCl(NPr_2)$
rac-$(CH_3)_2Si(2$-$CH_3$-4-phenyl-indenyl$)_2Zr(NMe_2)_2$
rac-$(CH_3)_2Si(2$-$CH_3$-4-phenyl-indenyl$)_2Zr(NEt_2)_2$
rac-$(CH_3)_2Si(2$-$CH_3$-4-phenyl-indenyl$)_2Zr$ $(NPr_2)_2$
rac-$(CH_3)_2Si(2$-$CH_3$-4-phenyl-indenyl$)_2Zr(CH_3)_2$
rac-$(CH_3)_2Si(2$-$CH_3$-4-phenyl-indenyl$)_2Zr(O$-phenyl$)_2$
rac-$(CH_3)_2C(3$-tertbutyl-indenyl$)_2ZrCl_2$ and
rac-$CH_2(3$-tertbutyl-indenyl$)_2ZrCl_2$ Alternatively, in a further subgroup of the metallocene compounds, the metal bears a Cp group as defined above and additionally a $\eta^1$ or $\eta^2$ ligand, wherein said ligands may or may not be bridged to each other. This subgroup includes so called "scorpionate compounds" (with constrained geometry) in which the metal is complexed by a $\eta^5$ ligand bridged to a $\eta^1$ or $\eta^2$ ligand, preferably $\eta^1$ (for example a σ-bonded) ligand, e.g. a metal complex of a Cp group as defined above, e.g. a cyclopentadienyl group which bears, via a bridge member, an acyclic or cyclic group containing at least one heteroatom, e.g. —NR"$_2$ as defined above. Such compounds are described e.g. in WO-A-96/13529, the contents of which are incorporated herein by reference.

Any alkyl, alkenyl or alkynyl residue referred to above alone or as a part of a larger moiety may be linear or branched, and preferably contains up to 9, e.g. up to 6, carbon atoms.

Aryl is preferably phenyl or naphthyl. Halogen means F, Cl, Br or I, preferably Cl.

Another subgroup of the organotransition metal compounds usable in the present invention are the non-metallocenes wherein the transition metal (preferably a group 4 to 6 transition metal, suitably Ti, Zr or Hf) has a co-ordination ligand other than $\eta^5$-ligand (i.e. other than cyclopentadienyl ligand). As examples of such compounds, i.a. transition metal complexes with nitrogen-based, cyclic or acyclic aliphatic or aromatic ligands, e.g. such as those described in WO-A-99/10353 or in the review of Gibson et al., in Angew Chem. Int. Ed. engl., 38:428–447 (1999), or with oxygen-based ligands, such as group 4 metal complexes bearing bidentate cyclic or acyclic aliphatic or aromatic alkoxide ligands, e.g. optionally substituted, bridged bisphenolic ligands (see i.a. the above review of Gibson et al.). Further specific examples of non-$\eta^5$ ligands are amides, amide-diphosphane, amidinato, aminopyridinate, benzamidinate, triazacyclononane, allyl, hydrocarbyl, beta-diketimate and alkoxide. The disclosures of the above documents are incorporated herein by reference.

It is particularly preferred to use bridged-bis-indenyl zirconocenes or hafnocenes, especially where the $C_6$ ring of the indenyl groups are substituted, e.g. at the 6-position or 4-position, by pendant aryl groups, e.g. where the ligand is a bridged bis(2-(alkyl or alkylsiloxy)-4-(aryl)-indenyl) group.

The preparation of metallocenes and the organic ligands thereof, usable in the invention is well documented in the prior art, and reference is made e.g. to the above cited documents. Some of said compounds are also commercially available. Thus said transition metal compounds can be prepared according to or analogously to the methods described in the literature, e.g. by first-preparing the organic ligand moiety and then metalling said organic ligand ($\eta$ ligand) with a transition metal. Alternatively, a metal ion of an existing metallocene can be exchanged for another metal ion through transmetallation.

As is conventional the metallocene may be used together with a cocatalyst or catalyst activator. Preferred as cocatalysts for metallocenes are the alumoxanes, in particular the $C_{1-10}$ alkylalumoxanes, most particularly methylalumoxane (MAO). Such alumoxanes can be used as the sole cocatalyst or together with other cocatalyst(s). Thus besides or in addition to alumoxanes, other cation complex forming activators can be used. In this regard mention may be made particularly to boron compounds known in the art. Said activators are commercially available or can be prepared according to the prior art literature.

Further alumoxane cocatalysts are described i.a. in WO-A-94/28034 which is incorporated herein by reference. These are linear or cyclic oligomers having up to 40, preferably 3 to 20, —(Al(R''')O)— repeat units (wherein R''' is hydrogen, $C_{1-10}$ alkyl (preferably methyl) or $C_{6-18}$ aryl or mixtures thereof).

The quantity of cocatalyst to be employed in the catalyst of the invention is thus variable, and depends on the conditions and the particular transition metal compounds chosen in a manner well known to a person skilled in the art.

The metallocene used in the process of the invention may be used as a homogeneous or, more preferably a heterogeneous catalyst. Thus it is preferably impregnated into a porous particulate catalyst support which may be organic or more preferably inorganic, e.g. silica, silica-alumina, etc. Where the catalyst is used with a cocatalyst or catalyst activator (generally an aluminium or boron containing compound, e.g. an organoaluminium compound (such as an alumoxane) or a non-coordinating ionic cocatalyst such as a boron activator), the catalyst and cocatalyst may be brought together in the polymerization reactor or beforehand. Especially preferably the metallocene is pre-reacted with an alumoxane (e.g. MAO, HIBAO or TIBAO, especially MAO) and the reaction product is impregnated into a porous particulate support, preferably in a dry mix procedure as described for example in WO 95/12622.

Where the metallocene is used together with an alumoxane cocatalyst, the aluminium:metallocene metal molar ratio is conveniently 3000:1 to 10:1, preferably 500:1 to 10:1, especially 400:1 to 20:1, particularly 300:1 to 50:1 in the catalyst system. As an example, with the boron activators, a 5:1 to 1:5 (preferably 2:1 to 1:2, such as 1:1) ratio of the transition metal to boron activator may be used.

Where the metallocene is impregnated into a porous inorganic support, this is preferably calcined beforehand, e.g. as described in WO 95/12622.

The process of the invention may be carried out in any known polymerisation process, such as in solution, suspension, slurry (in liquid or in bulk) or gas phase polymerisation process. In one preferred embodiment, it may be effected in propylene, either in liquid or supercritical fluid depending on the reaction conditions used. The critical temperature of propylene is 91.4° C. and the critical pressure is 45.5 bar. In another preferred embodiment it may be effected in slurry which contains monomer and an inert liquid, preferably an aliphatic hydrocarbon, e.g. heptane or octane, rather than an aromatic diluent such as toluene. The critical temperature and pressure may be suppressed by using other chemicals such as hydrocarbons in accordance with known methods. Preferably the process of the invention occurs in liquid or supercritical propylene. For subcritical temperatures, supercritical pressures may also be used.

The polymerisation may also be effected in continuous or batch mode. Conventional polymerisation reactors, e.g. loop or stirred tank or gas phase reactors, may be used and if desired polymerisation may be effected in more than one stage and/or in more than one reactor.

If desired, hydrogen may be used as a chain transfer agent in the polymerization reaction.

Moreover, a scavenger may be included in the reaction mixture, for example an organoaluminium compound, eg a trialkylaluminium such as triethylaluminium (TEAL) or triisobutylaluminium (TIBAL) or an alumoxane (such as MAO, TIBAO, HIBAO, etc).

Long chain branching of propylene polymers results in improved melt strength. Generally this has only been achievable for propylene polymers by post-reactor modification, e.g. peroxide or silane treatment or irradiation with ionizing radiation such as electron beams (see for example WO00/63287). We have now found that by performing metallocene catalysed propylene polymerisation as temperatures above 70° C., especially above 75° C., more particularly above 80° C. (i.e. according to the invention), significant long chain branching occurs. This is evidenced by the flow activation energies of the polymer product.

The flow activation energy ($E_a$), which represents the temperature dependence of the viscosity of the polymer melt, is sensitive to the presence of long chain branches in the polymer backbone. A higher flow activation energy can be related to the growing number of long branches. Flow activation energy values of up to about 40 kJ/mol have been reported in the literature for linear polypropylene homopolymers or random copolymers (see Mavridis et al. in Polym. Eng. Sci. 32:1778–1791 (1992)). Descriptions of flow activation energies and their determination may also be found for example in Mavridis et al. (supra), Eckstein et al. Macromolecules 31:1335–1340 (1998), and Saini et al. J. Macromol. Sci., Phys. B22:432–449 (1983).

The long chain branching can also be evaluated by comparing the shear thinning behaviour of polymers. The presence of long chain branching increases the elasticity of the polymer and results in higher shear thinning compared to a linear polymer. The higher shear thinning can be seen as the deeper decrease of the complex viscosity (Eta*) when moving from low to high values of complex modulus (G*).

Using the process of the present invention, it is possible to achieve $E_a$ values of 43 kJ/mol or higher without such post-reactor treatment and such polymers and long chain branched derivatives obtained by post-reactor treatment (e.g. peroxide or silane or ionizing radiation treated derivatives) form a further aspect of the present invention. Viewed from this aspect the invention provides a propylene-copolymer having on polymerization a flow activation energy of at least 43 kJ/mol, more preferably at least 45 kJ/mol, e.g. up to 90 kJ/mol.

The propylene polymers produced by the processes of the invention are themselves novel and form a further aspect of the invention. Viewed from this aspect the invention provides a propylene polymer produced or producible by a process according to the invention.

Viewed from a still further aspect the invention provides a propylene polymer article, e.g. a pipe, fibre, film, sheet, foamed or molded article formed from a polymer according to the invention, optionally after formulation (e.g. by addition of antioxidants, further polymers, light absorbers, colorants, fillers, etc.

Viewed from a still further aspect the invention provides the use of the copolymers of the invention for the manufacture of pipe, film, sheet, fibre, molded articles and foamed articles.

All documents referred to herein are hereby incorporated by reference.

The invention will now be illustrated further with reference to the following non-limiting Examples.

The silica-supported catalysts used in the Examples were prepared as described in WO 95/12622.

In the Examples, the following measurement techniques were used.

NMR

Incorporated comonomer contents were determined by nuclear magnetic resonance spectroscopy (NMR) from a quantitative proton-decoupled (NOE) $^{13}C$ spectra obtained at 120–130° C. on a CMX 400 Infinity (400 MHz) or a Varian Gemini 2000 (300 MHz) spectrometer from samples dissolved in 1,2,4-trichlorobenzene/benzene-$d_6$. The interpretation of spectra was made on the basis of the spectral assignments found in the literature of copolymers of higher olefins with propylene (see Cheng in Polym. Commun. 25:99–105 (1984)).

GPC

Weight average ($M_w$) and number average ($M_n$) molecular weights were measured with a Waters Alliance GPCV 2000 high temperature gel permeation chromatograph (GPC) operating at 140° C. using 1,2,4-trichlorobenzene as an eluant. The calibration of columns was done with polystyrene standards and polypropylene equivalent molecular weights were calculated using a universal calibration method.

DSC

The thermal behaviour of copolymers, melting temperatures ($T_m$) and glass transition temperatures ($T_g$) were determined by differential scanning calorimetry (DSC) according to ISO 11357. $T_m$ was measured as peak temperature from second melting endotherm at a heating rate of 10° C./min. Indium was used for the calibration of the temperature scale.

Dynamic Rheology

The rheological properties were measured by Rheometrics Scientific SR-500 stress controlled rotational rheometer (cone and plate geometry). The flow activation energies (Ea) were calculated from the frequency sweeps (frequencies between 0.01 rad/s and 100 rad/s) made at 170° C., 190° C. and 210° C. using Rheometrics Scientific RSI Orchestrator software version V6.5.3 and its two-dimensional minimization shift method. Corresponding stress sweeps were made to ensure the frequency sweeps were measured within the linearly viscoelastic (LVE) region. The diameter of the cone (and lower plate) was 25 mm, the cone angle 0.1 rad and the gap 45 mm. Higher molecular weight samples were characterised using parallel plates (diameter 25 mm with gap of 1.000 mm).

EXAMPLES 1–12

The supported catalyst (catalyst A=rac-$(CH_3)_2Si$(2-methyl-4-phenyl-indenyl)$_2$Zr $Cl_2$/MAO on silica, Zr content 0.14% wt, Al/Zr molar ratio 280; catalyst B=rac-$(CH_3)_2Si$(2-methyl-4-naphthyl-indenyl)$_2$ Zr $Cl_2$/MAO on silica, Zr content 0.17% wt, Al/Zr molar ratio 190) was fed at 30° C. into a 5 L reactor containing liquid propylene and the comonomer (1-hexene, 4-methyl-1-pentene or 1-octene).

The 5 L bench scale reactor was then heated up to the reaction temperature at the same rate for all runs (20 minutes to 90° C. and 23 minutes to 100° C.). Polymerization was allowed to proceed for 120 minutes whereafter it was halted by ethanol addition and flushing off of the remaining monomers (generally about 90% of the initial amounts). The run conditions and properties of the copolymer products are set out in Table 1 below.

TABLE 1

| Example | Comonomer | Comonomer (g) | Propene (g) | Run Temperature (° C.) | Comonomer Content mol % Feed[a] | Comonomer Content mol % Polymer[b] | Mw[+] (kg/mol) | Mw/Mn* | Tm[$] (° C.) | Ea (kJ/mol) |
|---|---|---|---|---|---|---|---|---|---|---|
| 1[c] | 1-hexene | 29.9 | 1500 | 60 | 1.0 | 0.8 | 697 | 2.4 | 138.5 | 40.3 |
| 2 | 1-hexene | 28.1 | 1400 | 70 | 1.0 | 1.0 | 667 | 2.4 | 136.0 | 38.6 |
| 3 | 1-hexene | 19.3 | 1300 | 80 | 0.7 | 1.0 | 562 | 2.1 | 135.2 | 51.8 |
| 4 | 1-hexene | 24.2 | 1200 | 90 | 1.0 | 1.3 | 418 | 2.5 | 134.9 | 58.6 |
| 3 | 1-hexene | 20.2 | 1000 | 100 | 1.0 | 1.6 | 374 | 3.4 | 130.2 | 80.8 |
| 6 | 1-hexene | 62.0 | 1200 | 90 | 2.5 | 3.1 | 300 | 3.3 | 117.3 | |
| 7 | 1-hexene | 50.0 | 1000 | 100 | 2.4 | 3.8 | 238 | 3.1 | 113.3 | 43.9 |
| 8 | 4-Me-1-pentene | 24.0 | 1200 | 90 | 1.0 | 1.0 | 308 | 2.5 | 137.5 | |
| 9 | 4-Me-1-pentene | 24.0 | 1000 | 100 | 1.2 | 1.2 | 192 | 3.2 | 134.1 | |
| 10 | 1-octene | 32.5 | 1200 | 90 | 1.0 | 1.5 | 362 | 2.7 | 132.7 | |
| 11 | 1-octene | 26.5 | 1000 | 100 | 1.0 | 2.2 | 200 | 3.1 | 126.2 | 47.3 |
| 12[d] | 1-hexene | 23.9 | 1200 | 90 | 1.0 | 1.3 | 697 | 2.9 | 133.2 | |

[a]initial comonomer content in polymerization medium
[b]calculated by $^{13}C$ NMR
[c]comparative example
[d]Examples 1 to 11 used catalyst A, Example 12 catalyst B
[+]calculated by GPC
*calculated by GPC
[$]calculated by DSC As can be seen, the comonomer incorporation rate is generally higher, the higher the run temperature is. Along with the increasing polymerization temperature, the flow activation energies are also increased which is evidence of the formation of long chain branched polymers. Additionally, in FIG. 1 of the accompanying drawings (which is a plot of complex viscosities as a function of G* at 210° C. for the polymers of Examples 1 to 5) it can be seen that polymers from polymerizations at higher temperatures (70° C. or more, Examples 2, 3, 4, and 5) show higher shear thinning compared to the polymer of Comparative Example 1.

EXAMPLES 13–29

Polymerization experiments were carried out in a PARR 600-ml steel autoclave. The liquid monomer mixture (approximately 1.7 mol) and additional MAO (final Al/Zr molar ratio 2280) were fed in at the beginning of the reaction. Charging of catalyst A/MAO supported on silica (amount of Zr $2.0*10^{-6}$ mol), started the polymerization. The temperature was kept at 70° C. and polymerization time was 30 min. The polymerization was terminated by injection of a pentane/methanol mixture into the reactor. The autoclave was degassed and the polymer was taken up in toluene. The product was then precipitated with dilute HCl/methanol solution, filtered, washed with methanol and dried under vacuum. Details of run conditions and product properties are set out in Table 2 below.

TABLE 2

| Examples | Comonomer | Feed (mol-%) | Polymer[a] (mol-%) | $M_w$[b] (kg/mol) | $M_w/M_n$[b] | $T_m$[c] (° C.) | $T_g$[c] (° C.) |
|---|---|---|---|---|---|---|---|
| 13 | 1-butene | 5 | 4.3 | 460 | 2.1 | 140 | −8 |
| 14 |  | 8 | 7.6 |  |  | 135 | −9 |
| 15 |  | 12 | 11.2 | 258 | 2.1 | 119 | −12 |
| 16 |  | 15 | 12.8 | 239 | 2.1 | 110 | −14 |
| 17 | 1-hexene | 2 | 3.1 |  |  | 126 | −7 |
| 18 |  | 4 | 4.0 | 336 | 2.1 | 110 | −10.5 |
| 19 |  | 8 | 8.9 | 183 | 2.5 | 73 | −15 |
| 20 |  | 15 | 14.7 | 169 | 2.0 | 47 | −18 |
| 21 |  | 20 | 20.5 |  |  | 40 | −19 |
| 22 | 1-octene | 2 | 2.6 | 257 | 2.3 | 120 | −9 |
| 23 |  | 8 | 7.7 | 196 | 2.1 | 81 | −19 |
| 24 |  | 10 | 10.2 | 165 | 1.9 | 66 | −22 |
| 25 |  | 20 | 20.2 |  |  |  | −27 |
| 26 | 1-dodecene | 8 | 9.1 | 192 | 2.0 |  | −35 |
| 27 |  | 15 | 17.0 |  |  |  | −39 |
| 28 | 1-hexadecene | 8 | 7.5 | 169 | 2.0 |  |  |
| 29 |  | 15 | 14.0 |  |  |  | −45 |

[a]13C NMR,
[b]GPC,
[c]DSC

In the copolymerizations conducted at 70° C. in the liquid monomer mixture the compositions of the produced copolymers are near to identical to the corresponding monomer compositions in the polymerization medium, even in the case of the higher molecular weight comonomers like 1-dodecene and 1-hexadecene.

EXAMPLES 30–37

Polymerization experiments were carried out in a PARR 600-ml steel autoclave. The polymerization medium (250 ml of n-heptane), MAO as scavenger (final Al/Zr molar ratio 2280) and comonomer were introduced into the reactor. The liquid phase was saturated with propylene (partial pressure 1.6 bar) at 70° C. after which the catalyst, rac-Me$_2$Si(2-Me-4-PhInd)$_2$ZrCl$_2$/MAO supported on silica or without carrier (amount of Zr 2.0*10$^{-6}$ mol), was added to the reactor to start the reaction. During polymerization the partial pressure of propylene was kept constant by continuously feeding in more propylene. The polymerization time was 5–60 min. The workup of the polymer product was as in Examples 13 to 29. Details of run conditions and product properties are set out in Table 3 below.

TABLE 3

| Run | Solvent | Catalyst Type | $t_{poly}$ (min) | 1-Octene in Feed (mol-%) | 1-Octene in Polymer[a] (mol-%) |
|---|---|---|---|---|---|
| 30 | n-heptane | supported | 22 | 6 | 6.6 |
| 31 |  |  | 30 | 10 | 9.7 |
| 32 |  |  | 30 | 15 | 17.3 |
| 33 |  |  | 60 | 20 | 23.2 |
| 34 |  | nonsupported | 5 | 6 | 5.1 |
| 35 |  |  | 7 | 10 | 10.8 |
| 36 |  |  | 12 | 15 | 16.2 |
| 37 |  |  | 12 | 20 | 22.8 |

[a]13C NMR

Once again, in the copolymerizations conducted at 70° C. in the n-heptane medium the compositions of the produced propylene/1-octene copolymers are near to identical to the corresponding monomer compositions in the polymerization medium, irrespective of the type of the catalyst used.

The invention claimed is:
1. A process for the preparation of a propylene polymer comprising polymerizing a mixture of:
   (a) propylene, and
   (b) a comonomer copolymerizable therewith which has molecular weight greater than propylene, wherein said comonomer is present in an amount of up to 10 mol % of the mixture of (a) and (b),
   wherein said polymerizing is a heterogeneous single site catalyst catalysed polymerization reaction comprising at least one stage, wherein at least one stage of said polymerization reaction is effected at least in part at a temperature of greater than 70° C. and is effected in propylene as reaction medium, and
   wherein said propylene polymer has a flow activation energy (Ea) of at least 43 kJ/mol.
2. The process as claimed in claim 1, wherein said single site catalyst is a metallocene.
3. The process as claimed in claim 2, wherein said metallocene is represented by formula I

$$(Cp)_m R_n MX_q \qquad (I)$$

wherein each Cp independently is an unsubstituted or substituted and/or fused homo- or heterocyclopentadienyl ligand
R is a bridge of 1–7 atoms;
M is a transition metal of group 3 to 6, a lanthanide or an actinide;
each X is independently a sigma-ligand;
n is 0, 1 or 2;
m is 1, or 2;
q is 1, 2 or 3; and
the sum of m and q is equal to the valency of M.
4. The process as claimed in claim 3, wherein said metallocene is selected from the group consisting of:
rac-(CH$_3$)$_2$Si(2-CH$_3$-4-phenyl-indenyl)$_2$ZrCl$_2$,
rac-(CH$_3$)$_2$Si(2-CH$_3$-4-phenyl-indenyl)$_2$TiCl$_2$,
rac-(CH$_3$)$_2$Si(2-CH$_3$-4-phenyl-indenyl)$_2$HfCl$_2$,
rac-(CH$_3$)$_3$Si(CH$_3$)Si(2-CH$_3$-4-phenyl-indenyl)$_2$ZrCl$_2$,
rac-(CH$_3$)$_2$Si(2-CH$_3$-4-(1-napthyl)-indenyl)$_2$ZrCl$_2$, rac-(CH$_3$)$_2$Si(2-CH$_3$-4-(4-tertbutyl-phenyl)-indenyl)$_2$ZrCl$_2$,
rac-(CH$_3$)$_2$Si(2-CH$_2$CH$_3$-4-phenyl-indenyl)$_2$ZrCl$_2$,
rac-(CH$_3$)$_2$Si(2-CH$_2$CH$_3$-4-(4-tertbutyl-phenyl)-indenyl)$_2$ZrCl$_2$,
rac-(CH$_3$)$_2$Si(2-CH(CH$_3$)$_2$-4-phenyl-indenyl)$_2$ZrCl$_2$,
rac-(CH$_3$)$_2$Si(2-CH(CH$_3$)$_2$-4-(1-napthyl)-indenyl)$_2$ZrCl$_2$,
rac-(CH$_3$)$_2$Si(2-CH(CH$_3$)$_2$-4-(4-tertbutyl-phenyl)-indenyl)$_2$ZrCl$_2$,
rac-(CH$_3$)$_2$Si(2-CH(CH$_3$)$_2$-4-(2-CH$_3$-phenyl)-indenyl)$_2$ZrCl$_2$,
rac-(CH$_3$)$_2$Si(2-CH(CH$_3$)$_2$-4-(3,5-(C$_3$)$_2$-phenyl)-indenyl)$_2$ZrCl$_2$,
rac-(CH$_3$)$_2$Si(2-CH$_3$-4-phenyl-indenyl)$_2$ZrCl(CH$_3$),
rac-(CH$_3$)$_2$Si(2-CH$_3$-4-phenyl-indenyl)$_2$ZrCl(NMe$_2$),
rac-(CH$_3$)$_2$Si(2-CH$_3$-4-phenyl-indenyl)$_2$ZrCl(O-phenyl),
rac-(CH$_3$)$_2$Si(2-CH$_3$-4-phenyl-indenyl)$_2$ZrCl(NEt$_2$),
rac-(CH$_3$)$_2$Si(2-CH$_3$-4-phenyl-indenyl)$_2$ZrCl(NPr$_2$),
rac-(CH$_3$)$_2$Si(2-CH$_3$-4-phenyl-indenyl)$_2$Zr(NMe$_2$)$_2$,
rac-(CH$_3$)$_2$Si(2-CH$_3$-4-phenyl-indenyl)$_2$Zr(NEt$_2$)$_2$,
rac-(CH$_3$)$_2$Si(2-CH$_3$-4-phenyl-indenyl)$_2$Zr(NPr$_2$)$_2$,
rac-(CH$_3$)$_2$Si(2-CH$_3$-4-phenyl-indenyl)$_2$Zr(CH$_3$)$_2$,
rac-(CH$_3$)$_2$Si(2-CH$_3$-4-phenyl-indenyl)$_2$Zr(O-phenyl)$_2$,
rac-(CH$_3$)$_2$C(3-tertbutyl-indenyl)$_2$ZrCl$_2$, and
rac-CH$_2$(3-tertbutyl-indenyl)$_2$ZrCl$_2$.

5. The process as claimed in claim 1, wherein said polymerization reaction is effected at least in part at a temperature of from 75 to 200° C.

6. The process as claimed in claim 1, wherein said polymerization reaction is effected at least in part at a temperature of from 80 to 125° C.

7. The process as claimed in claim 1, wherein said polymerization reaction is effected at least in part at a temperature of from 85 to 120° C.

8. The process as claimed in claim 1, wherein said polymerization reaction is effected at least in part under supercritical conditions.

9. The process as claimed in claim 1, wherein said comonomer is selected from the group consisting of $C_{4-30}$ alkenes and $C_{4-30}$ dienes.

10. The process as claimed in claim 9, wherein said comonomer is a $C_{4-16}$ alkene.

11. The process as claimed in claim 1, wherein said polymerization reaction is effected in at least two stages.

* * * * *